J. B. SCHUMAN.
SHOCK LOADER.
APPLICATION FILED AUG. 18, 1902.
910,423.
Patented Jan. 19, 1909.
2 SHEETS—SHEET 1.
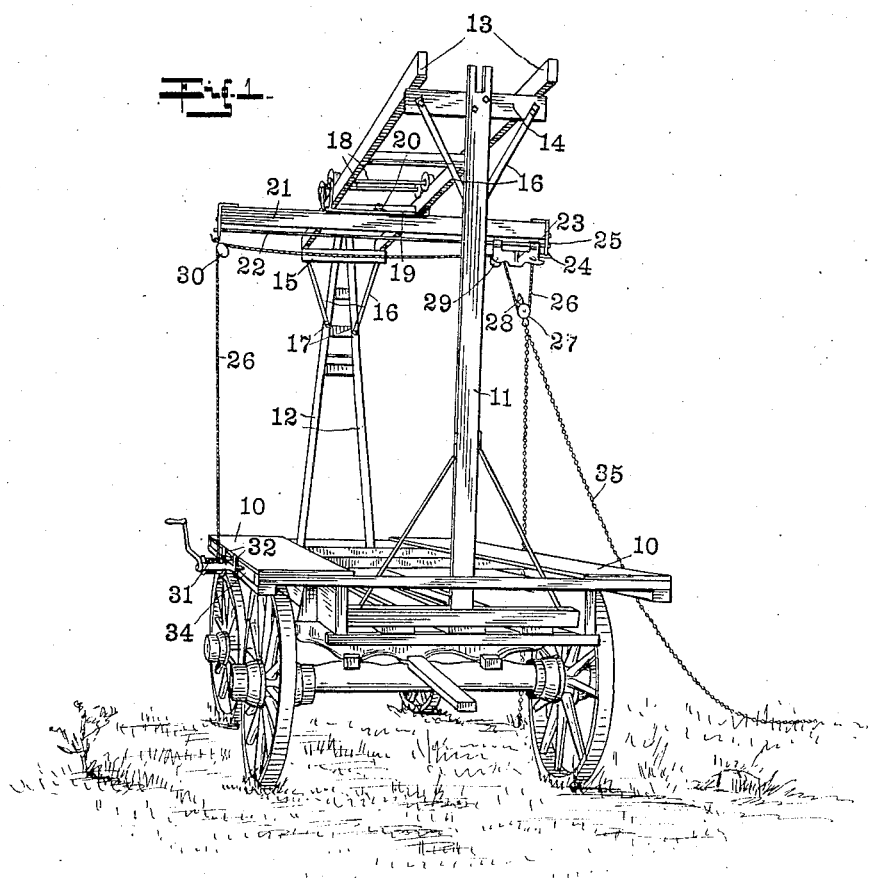
Witnesses
Chas N. Leonard
J.A. Walsh
Inventor
James B. Schuman
By
Bradford Hood
Attorneys J. B. SCHUMAN.
SHOCK LOADER.
APPLICATION FILED AUG. 18, 1902.
910,423.
Patented Jan. 19, 1909.
2 SHEETS—SHEET 2.
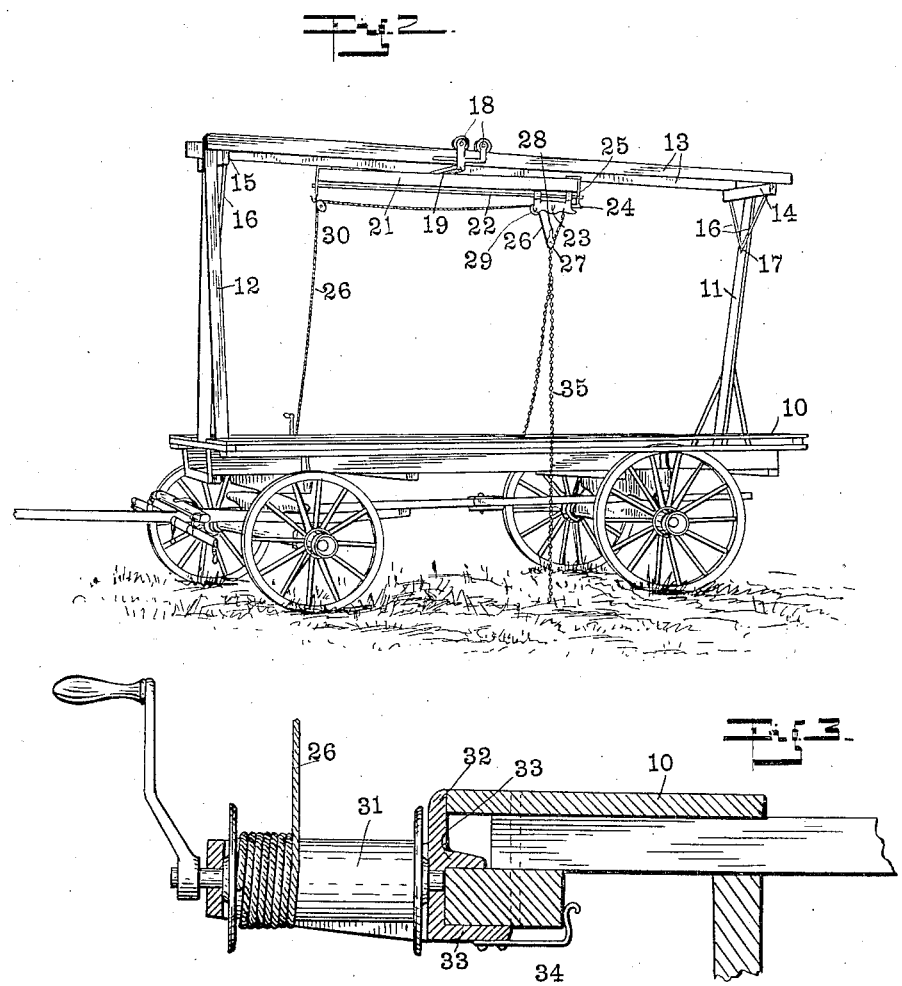
Witnesses
Chas N. Leonard
J. A. Walsh
Inventor
James B. Schuman
By
Bradford Hood
Attorneys

UNITED STATES PATENT OFFICE.

JAMES B. SCHUMAN, OF COLUMBIA CITY, INDIANA, ASSIGNOR TO JAMES B. SCHUMAN AND JOSEPH K. SHARPE, JR., BOTH OF INDIANAPOLIS, INDIANA, AND THEOPHILUS KING, OF QUINCY, MASSACHUSETTS, A COPARTNERSHIP.

SHOCK-LOADER.

No. 910,423.　　　Specification of Letters Patent.　　　Patented Jan. 19, 1909.

Application filed August 18, 1902. Serial No. 120,097.

*To all whom it may concern:*

Be it known that I, JAMES B. SCHUMAN, a citizen of the United States, residing at Columbia City, in the county of Whitley and State of Indiana, have invented certain new and useful Improvements in Shock-Loaders, of which the following is a specification.

The fodder value of corn stalks and leaves depends quite materially upon the cost of putting the same into a mow, and this cost depends largely upon the cost of handling and transporting the shocks of corn from the field to a suitable shredder.

The object of my invention is, therefore, to provide a mechanism which may be, if desired, easily attached to any usual hay rack or platform wagon, ordinarily found on every farm, and by means of which shocks of corn may be easily lifted bodily from the field and placed upright upon any part of the wagon bed.

The accompanying drawings illustrate my invention.

Figure 1 is a perspective view showing my improvement attached to an ordinary hay rack or wagon, the parts being in position to raise a shock from the ground to the wagon; Fig. 2 is a similar view showing the parts folded in transporting position; Fig. 3 is a detail of the windlass support.

In the drawings, 10 indicates the usual platform of a wagon such as is ordinarily found on every farm, said platform being provided at opposite ends with standards 11 and 12.

My improvement consists of a pair of parallel beams 13 connected at opposite ends by cross-arms 14 and 15 to form a pair of parallel tracks. The cross-arms 14 and 15 are connected to the upper ends of the uprights 11 and 12, respectively, and suitably braced by means of braces 16 detachably secured at 17 to the standards. Mounted upon tracks 13 are trucks 18, 18 from which depends a U-shaped supporting yoke 19 which passes beneath tracks 13. Pivoted to yoke 19, at 20, is a transverse track-beam 21 carrying a track 22 extending from end to end thereof. Mounted on track 22 is a carriage 23 of any usual and well known form, said carriage being provided with a usual spring catch-pawl 24 which, when the carriage is at one end of the track, is adapted to engage a stationary stop 25 so as to hold the carriage at that end of the track. Suspended from carriage 23 by a suitable cable 26 is a snatch-block 27 of usual form provided at its upper end with a wedge 28 which, when the snatch-block is drawn to its uppermost position, is adapted to engage the tail of pawl 24 so as to operate to release the same from the stop 25 in the usual manner. Cable 26 passes over a pulley 29 carried at the forward end of carriage 23; from thence to a snatch-block 30 suspended from the opposite end of transverse beam 21, and from thence to a windlass 31 which is supported upon a bracket 32. Bracket 32 is provided with a pair of ribs 33 which straddle a longitudinal track-beam 34 secured to the wagon-bed 10, one at each side thereof beneath the usual platform. Snatch-block 27 carries a chain 35 or any other suitable means adapted to embrace a shock.

In operation, the wagon is driven alongside a shock and trucks 18 shifted along tracks 13 until substantially opposite the shock. Carriage 23 is then pulled over along track 22 until its catch 24 engages the stop 25 so as to hold the carriage at this end of the track. Chain 35 is then wrapped about the shock in such manner as to hold the same, and the operator, by winding the windlass 31, draws the shock upward until its bottom is above the plane of the bed 10. By this time the wedge 28 of the snatch-block 27 comes into engagement with the catch 24 and releases the same, so that as the operator continues to wind upon the windlass the carriage 23 will be drawn along track 22 until the shock is brought to about the medial line of the platform whereupon it may be lowered in a standing position upon the platform. The operation is repeated at the next shock, the transverse beam 21 being shifted longitudinally of the bed, either before or after the shock has been lifted, until it lies immediately above that portion of the platform upon which the next shock is to be deposited. In driving from place to place the beam 21 may be turned upon its pivot until it lies parallel with the wagon body, as shown in Fig. 2.

I claim as my invention.

1. In a shock loader, the combination with a wagon, of a longitudinal track rigidly supported above a wagon-bed, a truck mounted thereon, a transverse track-beam carried by said truck, a carriage mounted upon said transverse beam and movable thereon, means consisting in part of a cable for engaging a shock carried by said carriage, and a windlass for engaging said cable.

2. In a shock loader, the combination with a wagon, of a longitudinal track structure rigidly supported above a wagon platform near the ends thereof, a truck mounted on said track structure, a transverse track-beam pivotally mounted upon said truck, a carriage movable along said transverse track-beam, lifting mechanism consisting in part of a cable carried by said carriage, and a windlass for engaging said cable.

3. In a shock loader, the combination, with a portable wagon platform, of a longitudinal track structure rigidly supported above the wagon platform by supports rising near the ends thereof, a truck mounted on said track structure and movable along the same, a transverse track beam, a lifting mechanism consisting in part of a cable carried by said carriage, said cable extending from the carriage over suitable guides on the track beam and thence downward to a point of convenient access.

4. In a shock loader, the combination, with a portable platform having a longitudinal windlass receiving member, of a track structure rigidly supported above the platform, lifting mechanism adapted to be supported by said track structure at different points in its length, a windlass, and means carried by said windlass for engagement with said longitudinal windlass member at different points in its length.

5. In a shock loader, the combination, with a portable platform having a longitudinal bar, of lifting mechanism supported above said platform, a windlass support provided with members adapted to embrace said longitudinal bar and permit said support to be moved longitudinally thereof, and a windlass journaled on said support.

6. In a shock loader, the combination with a portable platform having a longitudinal track-beam 34, of a windlass support having ribs 33 adapted to embrace said track-beam, means for holding said windlass support transversely of the track beam, and a windlass journaled on said support.

7. In a shock loader, the combination, with a portable wagon platform, of a longitudinal track structure rigidly supported above the wagon platform, a truck mounted on said track structure and movable along the same, a transverse track beam pivotally supported upon said truck so as to swing in a substantially horizontal plane, and lifting mechanism consisting in part of a cable carried by said carriage, said cable extending from the carriage over suitable guides on the track beam and thence downward to a point convenient of access.

In witness whereof, I, have hereunto set my hand and seal at Indianapolis, Indiana, this 11th day of August, A. D. one thousand nine hundred and two.

JAMES B. SCHUMAN. [L. S.]

Witnesses:
ARTHUR M. HOOD,
JAMES A. WALSH.